(12) United States Patent
Takahashi

(10) Patent No.: US 11,390,780 B2
(45) Date of Patent: *Jul. 19, 2022

(54) ADHESIVE COMPOSITION

(71) Applicant: HITACHI CHEMICAL COMPANY, LTD., Tokyo (JP)

(72) Inventor: Yuzuru Takahashi, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 279 days.

This patent is subject to a terminal disclaimer.

(21) Appl. No.: 16/498,253

(22) PCT Filed: Dec. 11, 2017

(86) PCT No.: PCT/JP2017/044414
§ 371 (c)(1),
(2) Date: Sep. 26, 2019

(87) PCT Pub. No.: WO2018/179609
PCT Pub. Date: Oct. 4, 2018

(65) Prior Publication Data
US 2020/0017731 A1 Jan. 16, 2020

(30) Foreign Application Priority Data
Mar. 30, 2017 (JP) .............................. JP2017-067715

(51) Int. Cl.
C09J 11/06 (2006.01)
C09J 11/08 (2006.01)
C09J 123/14 (2006.01)
C09J 123/20 (2006.01)

(52) U.S. Cl.
CPC ............... *C09J 11/06* (2013.01); *C09J 11/08* (2013.01); *C09J 123/14* (2013.01); *C09J 123/20* (2013.01)

(58) Field of Classification Search
CPC ........ C09J 11/06; C09J 123/14; C09J 123/20; C09J 11/08
USPC ........................................................ 524/62
See application file for complete search history.

(56) References Cited

U.S. PATENT DOCUMENTS

| 5,512,625 A * | 4/1996 | Butterbach | ............ C09J 123/16 |
| | | | 524/490 |
| 2014/0199545 A1* | 7/2014 | Moriguchi | ............ C09J 123/12 |
| | | | 428/349 |

FOREIGN PATENT DOCUMENTS

| CN | 103797081 A | 5/2014 |
| JP | H05-140522 A | 6/1993 |
| JP | 2004-284575 A | 10/2004 |
| JP | 2005-290339 A | 10/2005 |
| JP | 2013-064055 A | 4/2013 |
| JP | 2013-216724 A | 10/2013 |
| JP | 2014210841 A * | 11/2014 |
| JP | 2017-095685 A | 6/2017 |
| WO | 2017/061061 A1 | 4/2017 |

OTHER PUBLICATIONS

Translation of JP2014-210841, Nov. 13, 2014. (Year: 2014).*

* cited by examiner

*Primary Examiner* — Hui H Chin
(74) *Attorney, Agent, or Firm* — Fitch, Even, Tabin & Flannery, LLP

(57) ABSTRACT

The present invention relates to an adhesive composition comprising an α-olefin homopolymer, an α-olefin copolymer having a melting point of 90° C. or higher, a tackifier resin, a wax, and a liquid softener, wherein a complex shear modulus (I) measured immediately after heating the adhesive composition to 180° C. and cooling the same to 20° C. is 1 MPa or less.

6 Claims, No Drawings

ADHESIVE COMPOSITION

CROSS-REFERENCE TO RELATED APPLICATIONS

This application is a U.S. national phase application filed under 35 U.S.C. § 371 of International Application No. PCT/JP2017/044414, filed Dec. 11, 2017, designating the United States, which claims priority from Japanese Patent Application No. 2017-067715, filed Mar. 30, 2017, which are hereby incorporated herein by reference in their entirety.

TECHNICAL FIELD

The present invention relates to a solvent-free non-reactive adhesive composition for automotive interior, which is used when bonding a molded product made of polyolefin or the like and a covering material such as a fabric lined with a polyurethane foam, and provides a long open time and excellent bonding properties by single spread.

BACKGROUND ART

A door, an instrument panel, a ceiling material, a rear tray, a pillar, and the like, which are automotive interior materials, generally comprise a molded product and a covering material. As the molded product, a polyolefin molded product is mainly used. On the other hand, a covering material such as a polyurethane foam, a fabric lined with a polyurethane foam, or polyolefin is used as the covering material. The molded product and the covering material are bonded by a pressure forming method, a vacuum forming method or the like using an adhesive.

A solvent-based one-pack reactive adhesive is used as the adhesive for automotive interior up to date particularly in order to secure thermal creep resistance properties. For example, a chloroprene rubber-based adhesive consisting of modified polychloroprene, a tackifier, and an organic solvent is disclosed in Patent Literature 1. An adhesive which contains a styrene block copolymer and liquid rubber in combination and do not contain halogen such as chlorine is disclosed in Patent Literature 2. However, the level of environmental requirements is increased, and therefore a switch to a solvent-free adhesive is desired.

Examples of the alternative candidate to render the solvent-based adhesive for automotive interior free from solvents include a hot-melt adhesive. Among the hot-melt adhesives, a reactive hot-melt adhesive has a characteristic of excellent heat resistance.

However, the reactive hot-melt adhesive has the disadvantage of difficulty keeping a balance between a curing time and stability during application work and storage. In light of bonding properties when an adherend is a polyolefin molded product, a reactive polyolefin adhesive obtained by silane-modifying polyolefin, such as a composition disclosed in Patent Literature 3 is the candidate. However, the reactive polyolefin adhesive emits an organic solvent into an atmosphere by hydrolysis reaction during curing, and therefore has a fear from the viewpoint of an environment-friendly adhesive.

Among the hot-melt adhesives other than the reactive hot-melt adhesive, a non-reactive, hot-melt adhesive provides no fear that an organic solvent derived from raw materials and a hydrolysis reaction volatilizes from it, and the non-reactive, hot-melt adhesive is thus very greatly expected as the environment-responsive adhesive, and promising. The non-reactive hot-melt adhesive requires no curing time, and has high stability during application work and storage, which is convenient for users. As for such a non-reactive adhesive having excellent bonding properties to polyolefin molded products, for example, a method of use of a hot-melt adhesive in which the surface temperature of a hot-melt adhesive when bonding is set to be equal to or higher than the temperature of the atmosphere when measuring thermal creep resistance in order to obtain thermal creep resistance properties is disclosed in Patent Literature 4.

CITATION LIST

Patent Literature

Patent Literature 1: JP H05-140522 A
Patent Literature 2: JP 2005-290339 A
Patent Literature 3: JP 2013-216724 A
Patent Literature 4: JP 2004-284575 A

SUMMARY OF INVENTION

Technical Problem

However, the hot-melt adhesive described in Patent Literature 4 has the disadvantage of an extremely short open time. Here, the "open time" is a time from separating the hot-melt adhesive melted by heating from a heat source to pressure-forming adherends for bonding them together, i.e., a working life. In light of the workability in bonding work, an adhesive having a long open time is easier to use. Furthermore, when a fabric material as a covering is pasted immediately after the hot-melt adhesive is melted by heating, the fabric becomes a heat-pressed state because the melted adhesive has a high temperature, and bristle falling thus occurs on the surface of the fabric. The bristle falling is a so-called poor appearance, such as streak or color unevenness, caused by the deformation or transformation of bristles. Therefore, also in view of design properties, it is preferable that the open time be long.

When a polyolefin molded product and a fabric (covering material) lined with a polyurethane foam are bonded by a pressure forming method involving single spread of applying an conventionally known non-reactive, hot-melt adhesive to only a covering material side whose heat dissipation properties are good with respect to a molded product, it is necessary to set the open time to 5 seconds or less. In particular, thermal creep resistance properties may not be obtained. If the hot-melt adhesive is softened in order to extend the open time, a cohesive force is decreased, so that thermal creep resistance properties cannot be obtained. Therefore, it is difficult to achieve both the thermal creep resistance properties of the hot-melt adhesive and the extension of the open time.

Solution to Problem

In order to solve the problems, the present invention provides (1) an adhesive composition comprising an α-olefin homopolymer, an α-olefin copolymer having a melting point of 90° C. or higher, a tackifier resin, a wax, and a liquid softener, wherein a complex shear modulus (I) measured immediately after heating the adhesive composition to 180° C. and cooling the same to 20° C. is 1 MPa or less.

The present invention also provides (2) the adhesive composition according to (1), wherein the α-olefin homopolymer contains at least one of a 1-butene homopolymer and a propylene homopolymer.

The present invention further provides (3) the adhesive composition according to (1) or (2), wherein the α-olefin copolymer contains at least one of a 1-butene/α-olefin copolymer and a propylene/α-olefin copolymer.

The present invention further provides (4) the adhesive composition according to any one of (1) to (3), wherein the tackifier resin contains at least one selected from the group consisting of a terpene phenol resin, a hydrogenated terpene resin, and a hydrogenated petroleum resin.

The present invention further provides (5) the adhesive composition according to any one of (1) to (4), wherein the wax contains a polypropylene-based wax.

The present invention further provides (6) the adhesive composition according to any one of (1) to (5) having a melt viscosity of 100 Pa·s or less at 180° C.

(7) The adhesive composition according to any one of (1) to (6), wherein a peeling length is 10 mm or less when performing a thermal creep resistance test with a load of 100 g for 24 hours in an atmosphere of 80° C. after bonding adherends via the adhesive composition with an open time of 45 seconds is also in the scope of the present invention.

Advantageous Effects of Invention

The adhesive composition of the present invention can exhibit excellent thermal creep resistance properties even when bonding adherends with an open time of 45 seconds according to the constitution. That is, the adhesive composition of the present invention is a solvent-free adhesive in consideration of environmental problems, and can be suitably used as an adhesive for automotive interior exhibiting excellent bonding properties to a polyolefin molded product even after an open time of 45 seconds in spite of being a non-reactive adhesive composition.

DESCRIPTION OF EMBODIMENTS

Hereinafter, an embodiment of the present invention will be described in detail. However, the present invention is in no way limited to the following embodiment.

An adhesive composition of the present embodiment is an adhesive composition comprising an α-olefin homopolymer, an α-olefin copolymer having a melting point of 90° C. or higher, a tackifier resin, a wax, and a liquid softener, wherein a complex shear modulus (I) measured immediately after heating the adhesive composition to 180° C. and cooling the same to 20° C. is 1 MPa or less. That is, the adhesive composition of the present embodiment is a mixture containing an α-olefin homopolymer, an α-olefin copolymer having a melting point of 90° C. or higher, a tackifier resin, a wax, and a liquid softener as essential ingredients. The complex shear modulus (I) measured immediately after cooling the mixture to 20° C. is 1 MPa or less.

The adhesive composition of the present embodiment may be an adhesive composition exhibiting delayed tack behavior where complex shear modulus (II) measured after 1500 seconds from cooling the mixture to 20° C. is two or more times as large as the complex shear modulus (I). It has been known that an ordinary hot-melt adhesive comes to exhibit adhesiveness by heating and is quickly solidified by radiation of heat (cooling) and therefore comes to exhibit no adhesiveness. On the other hand, the delayed tack behavior refers to the behavior for maintaining the adhesiveness for a while even when the radiation of heat (cooling) is performed after the adhesive composition comes to exhibit the adhesiveness by heating. The adhesive composition of the present embodiment exhibits the delayed tack behavior and is thus capable of exhibiting the adhesiveness even after the temperature of the adhesive composition drops, in spite of being a hot-melt adhesive.

The α-olefin homopolymer according to the present embodiment due to its crystallinity derived from a homopolymer, can impart heat resistance to the adhesive composition. Taking account of an impact on a melt viscosity of the adhesive composition at 180° C., the MFR (190° C., load: 2.16 kg) of the α-olefin homopolymer is preferably 100 g/10 min or more, and further preferably 200 g/10 min or more but not particularly limited thereto since it is different depending on various intended physical properties. Here, the MFR means a melt flow rate.

It is preferable that α-olefin as a constituent monomer of the α-olefin homopolymer be, for example, α-olefin having 2 to 8 carbon atoms such as ethylene, propylene, 1-butene, and 1-octene, and more preferable that the α-olefin be α-olefin having 3 to 4 carbon atoms so that the homopolymer exhibits a melting point of 120° C. or higher. As the commercialized product of the α-olefin homopolymer, trade name "PB0800M" manufactured by LyondellBasell Industries Holdings B.V., "Achieve 6936G2" manufactured by Exxon Mobil Corporation, "Prime Polypro S13B" manufactured by Prime Polymer Co., Ltd., or the like can be used. The melting point of this material is a differential scanning calorimetry (DSC) value after 10 days from the solidification of the material from the molten state and is a temperature at the vertex of a melting peak. These α-olefin homopolymers can be used in combinations of two or more. It is preferable that the α-olefin homopolymer contain at least one of a 1-butene homopolymer and a propylene homopolymer.

It is preferable that a content of the α-olefin homopolymer be 10 parts by mass or more in view of heat resistance, and be 30 parts by mass or less in view of flexibility of a coated layer formed from the adhesive composition (hereinafter, referred to as an "adhesive coated layer"). The content of the α-olefin homopolymer is more preferably 12 to 28 parts by mass, and further preferably 15 to 25 parts by mass. If the content of the α-olefin homopolymer is less than 10 parts by mass, sufficient heat resistance is sometimes difficult to obtain, and if the content of the α-olefin homopolymer is more than 30 parts by mass, an adhesive coated layer sometimes becomes hard, causing a decrease in adhesion.

The tackifier resin can impart tackiness during melting to the α-olefin copolymer having a melting point of 90° C. or higher according to the present embodiment. Since the α-olefin copolymer has a melting point higher than the temperature of the atmosphere of the measurement of thermal creep resistance, heat resistance in the intended application is not impaired. Therefore, the α-olefin copolymer contributes to various functions such as the flexibility, adhesiveness and heat resistance of the adhesive coated layer. The melting point of this material is a differential scanning calorimetry (DSC) value after 10 days from the solidification of the material from the molten state and is a temperature at the vertex of a melting peak. The α-olefin copolymer is a copolymer of α-olefin monomers of two or more kinds and is a copolymer of α-olefin of one or more kinds and a monomer of one or more kinds, except for α-olefin, exhibiting copolymerization properties with α-olefin.

It is preferable that α-olefin as a constituent monomer of the α-olefin copolymer be α-olefin having 2 to 8 carbon atoms such as ethylene, propylene, 1-butene, and 1-octene, and more preferable that the α-olefin be α-olefin having 2 to 4 carbon atoms. As the commercialized product of the α-olefin copolymer, trade names "TAFMER BL2491M", "TAFMER BL3450M", "TAFMER BL3110M", "TAFMER PN-2070", "TAFMER PN-3560", "TAFMER PN-2060", "TAFMER PN-20300", "TAFMER PN-0040" ("TAFMER" is a registered trademark) or the like manufactured by Mitsui Chemicals, Inc. can be used. These α-olefin copolymers can be used in combinations of two or more.

A content of the α-olefin copolymer having a melting point of 90° C. or higher is preferably 7 to 27 parts by mass, more preferably 9 to 25 parts by mass, and further preferably 12 to 22 parts by mass, in view of adhesiveness. The lower limit of the melting point of the α-olefin copolymer is more preferably 100° C. or higher. Furthermore, a preferable form of the α-olefin copolymer contains at least one of a 1-butene/α-olefin copolymer and a propylene/α-olefin copolymer. The upper limit value of the melting point of the α-olefin copolymer is not particularly limited, and may be about 160° C.

The tackifier resin according to the present embodiment can be selected depending on various intended physical properties from the group consisting of, for example, a petroleum resin, a pure monomer-based petroleum resin, a hydrogenated petroleum resin, a rosin resin, a rosin ester resin, a hydrogenated rosin resin, a terpene resin, a terpene-phenol resin, an aromatic modified terpene resin, a hydrogenated terpene resin, a coumarone-indene resin, an alkyl phenol resin, and a xylene resin. In order to impart good tackiness during melting to the α-olefin copolymer, the more desirable tackifier resin is a non-aromatic structure-containing resin such as a terpene-phenol resin or a hydrogenated resin (a hydrogenated terpene resin, a hydrogenated petroleum resin, or the like). It is preferable that the tackifier resin contain at least one selected from the group consisting of a terpene-phenol resin, a hydrogenated terpene resin, and a hydrogenated petroleum resin.

As the commercialized product of the tackifier resin, trade names "ARKON M90", "ARKON M100", "ARKON M115", "ARKON M135", "ARKON P90", "ARKON P100", "ARKON P115", "ARKON P125", and "ARKON P140" ("ARKON" is a registered trademark) manufactured by ARAKAWA CHEMICAL INDUSTRIES, LTD., trade names "YS POLYSTER T80", "YS POLYSTER T100", "YS POLYSTER T115", "YS POLYSTER T130", "YS POLYSTER T145", "YS POLYSTER T160", "YS POLYSTER S145", "YS POLYSTER G125", "YS POLYSTER G150", "CLEARON P85", "CLEARON P105", "CLEARON P115", "CLEARON P125", "CLEARON P135", and "CLEARON P150" ("CLEARON" is a registered trademark) manufactured by YASUHARA CHEMICAL CO., LTD., and trade names "Eastotac C-100R", "Eastotac C-100L", "Eastotac C-100W", "Eastotac C-115R", "Eastotac C-115 L", "Eastotac C-115 W", "Eastotac H-100R", "Eastotac H-100L", "Eastotac H-100W", "Eastotac H-115R", "Eastotac H-115L", "Eastotac H-115 W", "Eastotac H-130R", "Eastotac H-130L", "Eastotac H-130W", "Eastotac H-142R", "Eastotac H-142W", "Regalite R1090", "Regalite R1100", "Regalite S1100", "Regalite R1125", "Regalite R9100", "Regalite R7100", "Regalite S7125", "Regalite C6100", "Regalite S5100", "Regalrez 1085", "Regalrez 1094", "Regalrez 1126", "Regalrez 1128", "Regalrez 1139", "Regalrez 6108", and "Regalrez 3102" manufactured by Eastman Chemical Company, can be used, for example. These tackifier resins can be used in combinations of two or more.

A softening point of the tackifier resin is preferably 90° C. or higher, more preferably 115° C. or higher, and further preferably 125° C. or higher. The softening point of the tackifier resin is a Ring and Ball softening point. The upper limit value of the softening point of the tackifier resin is not particularly limited, and may be about 160° C.

A content of the tackifier resin is preferably 17 to 57 parts by mass, more preferably 22 to 52 parts by mass, and further preferably 27 to 47 parts by mass, in view of adhesiveness.

The wax according to the present embodiment contributes to the exhibition of the heat resistance of the adhesive composition that has been solidified by cooling in addition to imparting wettability to an adherend using a viscosity-reduction effect on the wax when being melted by heating. Therefore, it is preferable that the wax have a Ring and Ball softening point of 100° C. or higher. Further, in light of bonding properties with respect to polypropylene, it is preferable that a kind of the wax be a polypropylene-based wax having a polypropylene structure.

As the commercialized product of the wax, trade names "Viscol 660-P" and "Viscol 550-P" ("Viscol" is a registered trademark) manufactured by Sanyo Chemical Industries, Ltd., can be used, for example. These waxes can be used in combinations of two or more.

It is preferable that a content of the wax be 4 parts by mass or more in view of heat resistance, and be 24 parts by mass or less in view of flexibility of the adhesive coated layer. The content of the wax is more preferably 6 to 22 parts by mass, and further preferably 10 to 18 parts by mass.

Being in a liquid form at normal temperature, the liquid softener according to the present embodiment further enhances the adhesiveness provided by the tackifier resin when being melted by heating, thereby contributing to the extension of the open time of the adhesive composition. Further, it is presumed that crystallization is delayed when a crystalline polymer such as an α-olefin homopolymer and/or an α-olefin copolymer having a melting point of 90° C. or higher, which is melted by heating, is cooled, thereby allowing the adhesive composition to exhibit the delayed tack behavior. However, such a presumption is not clear at this stage.

The liquid softener can be selected depending on various intended physical properties from the group of materials in a liquid form at normal temperature such as liquid paraffin, a process oil such as a paraffin-based process oil, a naphthene-based process oil, and an aromatic process oil, acid anhydride modified liquid hydrocarbon, a liquid rubber such as liquid polyisoprene, and liquid polybutene. In light of good compatibility with the α-olefin homopolymer and/or the α-olefin copolymer having a melting point of 90° C. or higher, it is preferable that a kind of the liquid softener be liquid hydrocarbon.

It is preferable that the kinetic viscosity (100° C., JIS K 2283) of the liquid softener be 3 mm$^2$/s or more, but not particularly limited thereto since it is different depending on various intended physical properties. The kinetic viscosity of the liquid softener is more preferably 30 mm$^2$/s or more, and further preferably 50 mm$^2$/s or more. As the commercialized product of the liquid softener, trade names "Nissan Polybutene 200N", "Nissan Polybutene 30N", "Nissan Polybutene 10N" and "Nissan Polybutene 3N" manufactured by NOF Corporation, and trade names "LUCANT HC-2000", "LUCANT HC-600" and "LUCANT HC100" ("LUCANT" is a registered trademark) manufactured by Mitsui Chemicals, Inc., can be used, for example. These liquid softeners can be used in combinations of two or more.

It is preferable that a content of the liquid softener be 2 parts by mass or more in view of the extension effect of the open time, and be 22 parts by mass or less in view of the heat resistance. The content of the liquid softener is more preferably 4 to 20 parts by mass, and further preferably 8 to 16 parts by mass.

The content of each of the above-mentioned ingredients is a proportion on the basis of a total of 100 parts by mass of the α-olefin homopolymer, α-olefin copolymer having a melting point of 90° C. or higher, tackifier resin, wax, and liquid softener.

The adhesive composition of the present embodiment may contain additives such as an antioxidant, a stabilizer, a colorant, a compatibilizer, and an antiblocking agent, if needed, in addition to the total of 100 parts by mass of the above-mentioned essential ingredients.

In the adhesive composition of the present embodiment, the complex shear modulus (I) measured immediately after heating the adhesive composition to 180° C. and cooling the same to 20° C. is 1 MPa or less. With the complex shear modulus (I) according to the present embodiment being 1 MPa or less, bonding can be achieved even if a pressure forming process of the adhesive composition is performed after 45 seconds of the open time. A more preferable complex shear modulus (I) is 600 kPa (0.6 MPa) or less and a further preferable complex shear modulus (I) is 400 kPa (0.4 MPa) or less. Here, the complex shear modulus (I) is measured by a dynamic viscoelastic method described below and refers to a measured value of complex shear modulus at the time that an adhesive composition first reaches 20.04° C. or lower after the start of cooling. Using the method described below, a time for the adhesive composition to first reach 20.04° C. or lower after the start of cooling is 220 to 260 seconds after the start of cooling.

It is preferable that complex shear modulus (II) after 1500 seconds (25 minutes) from cooling the adhesive composition to 20° C. be two or more times as large as the complex shear modulus (I). With the complex shear modulus (II) according to the present embodiment being two or more times as large as the complex shear modulus (I), the adhesive composition is more likely to exhibit heat resistance in spite of being non-reactive. A more preferable ratio of [complex shear modulus (II)]/[complex shear modulus (I)] is 3 or more, and a further preferable ratio of [complex shear modulus (II)]/[complex shear modulus (I)] is 5 or more. Here, the complex shear modulus (II) refers to a measured value of complex shear modulus, which is measured in accordance with Dynamic Viscoelasticity Measurement described below, at the point of time after 1500 seconds from the start of measuring the complex shear modulus of the adhesive composition at 20° C.

In view of application properties and heat resistance, regarding the adhesive composition of the present embodiment, it is preferable that the melt viscosity at 180° C. be 100 Pa·s or less, more preferable that the melt viscosity be 10 to 100 Pa·s, and further preferable that the melt viscosity be 15 to 80 Pa·s. The melt viscosity can be measured with a Brookfield viscometer in accordance with JIS K6862.

In view of temperature allowable for melting and heat resistance, it is preferable that a softening point of the adhesive composition of the present embodiment be 100 to 170° C., and more preferable that the softening point be 120 to 150° C. The softening point can be measured by a ring and ball method in accordance with JIS K6863.

The adhesive composition of the present embodiment is generally produced through the following processes. Specifically, after an α-olefin copolymer having a melting point of 90° C. or higher and a tackifier resin are melted and kneaded at the same time in a kneader set to 180° C. for complete melting, an α-olefin homopolymer is added thereto, followed by kneading for complete melting.

Next, a wax and a liquid softener are added thereto, and the resultant is kneaded for complete melting, to obtain a melted product. The obtained melted product is put in a mold release box or the like or cut to a pellet or the like and solidified by cooling to produce an adhesive composition of the present embodiment. The adhesive composition of the present embodiment can be used as a hot-melt adhesive.

The adhesive composition of the present embodiment can extend a time (open time) from heating it by a heat source (for example, a far-infrared heater) and then separating it from the heat source to bonding adherends. The adhesive composition of the present embodiment can achieve both thermal creep resistance properties and extension of the open time. For example, a peeling length can be 10 mm or less when performing a thermal creep resistance test with a load of 100 g for 24 hours in an atmosphere of 80° C. after bonding adherends via the adhesive composition of the present embodiment with the open time of 45 seconds from separating the heated adhesive composition from the heat source. In other words, the adhesive composition of the present embodiment results in the peeling length of 10 mm or less in the thermal creep resistance test (load: 100 g, 80° C., 24 hours) after bonding with the open time of 45 seconds.

Since the adhesive composition of the present embodiment exhibits the delayed tack behavior and also exhibits excellent heat resistance after solidification, the adhesive composition can be used in fields that require heat resistance and can be used in a temperature range where bonding can be achieved with a conventional heat resistant hot-melt adhesive. Specifically, the adhesive composition of the present embodiment is suitable as an adhesive for decorating an automotive door trim used for bonding a polyurethane foam, a fabric, and the like which are the kinds of adherends that transform when being pressure-formed at a high-temperature range of 100° C. or higher.

EXAMPLES

Next, the present invention will be described in more detail by way of Examples and Comparative Examples, but the present invention is not limited thereby.

[Production of Adhesive Composition]

Example 1

0.5 parts by mass of a hindered phenol antioxidant "Irganox 1010" (manufactured by BASF Corporation), 0.5 parts by mass of a phosphorus-based antioxidant "Irgafos 168" (manufactured by BASF Corporation), 17 parts by mass of a propylene/α-olefin copolymer "TAFMER PN-2070" (manufactured by Mitsui Chemicals, Inc., melting point: 140° C.), and 37 parts by mass of a hydrogenated terpene resin "CLEARON P150" (manufactured by Yasuhara Chemical Co., Ltd., softening point: 150° C.) were melted and kneaded at the same time for complete melting in a 2 L-volume kneader set to 180° C. so that the total amount of raw materials fed was set to 1 kg, and 20 parts by mass of a 1-butene homopolymer "PB0800M" (manufactured by LyondelBasell Industries, melting point: 124° C.) was then added thereto, followed by kneading for complete melting. Next, 14 parts by mass of a polypropylene-based wax "Viscol 660-P" (manufactured by Sanyo Chemical Industries, Ltd., softening point: 145° C.) and 12 parts by mass of liquid polybutene "Nissan Polybutene 30N" (manufactured by NOF Corporation) were added thereto, followed by kneading for complete melting, and a mold release box was filled with the obtained melted product to obtain a hot-melt adhesive (1).

Example 2

0.5 parts by mass of a hindered phenol antioxidant "Irganox 1010", 0.5 parts by mass of a phosphorus-based antioxidant "Irgafos 168", 17 parts by mass of a 1-butene/α-olefin copolymer "TAFMER BL3450M" (manufactured by Mitsui Chemicals, Inc., melting point: 100° C.), and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 20 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (2).

The hot-melt adhesive (2) was obtained by replacing the propylene/α-olefin copolymer "TAFMER PN-2070" in Example 1 with the 1-butene-/α-olefin copolymer "TAFMER BL3450M."

Example 3

0.5 parts by mass of a hindered phenol antioxidant "Irganox 1010", 0.5 parts by mass of a phosphorus-based antioxidant "Irgafos 168", 22 parts by mass of a propylene/α-olefin copolymer "TAFMER PN-2070", and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 15 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (3).

The hot-melt adhesive (3) was obtained by changing the amount of the propylene/α-olefin copolymer "TAFMER PN-2070" blended in Example 1 from 17 parts by mass to 22 parts by mass, and the amount of the 1-butene homopolymer "PB0800M" blended from 20 parts by mass to 15 parts by mass.

Example 4

0.5 parts by mass of a hindered phenol antioxidant "Irganox 1010", 0.5 parts by mass of a phosphorus-based antioxidant "Irgafos 168", 12 parts by mass of a propylene/α-olefin copolymer "TAFMER PN-2070", and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 25 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (4).

The hot-melt adhesive (4) was obtained by changing the amount of the propylene/α-olefin copolymer "TAFMER PN-2070" blended in Example 1 from 17 parts by mass to 12 parts by mass, and the amount of the 1-butene homopolymer "PB0800M" blended from 20 parts by mass to 25 parts by mass.

Example 5

0.5 parts by mass of a hindered phenol antioxidant "Irganox 1010", 0.5 parts by mass of a phosphorus-based antioxidant "Irgafos 168", 17 parts by mass of a propylene/α-olefin copolymer "TAFMER PN-2070", and 37 parts by mass of a hydrogenated terpene resin "CLEARON P125" (manufactured by Yasuhara Chemical Co., Ltd., softening point: 125° C.) were melted and kneaded at the same time in a 2 L-volume kneader set to 180° C. so that the total amount of raw materials fed was set to 1 kg. After complete melting, 20 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (5).

The hot-melt adhesive (5) was obtained by replacing the hydrogenated terpene resin "CLEARON P150" in Example 1 with the hydrogenated terpene resin "CLEARON P125."

Example 6

0.5 parts by mass of a hindered phenol antioxidant "Irganox 1010", 0.5 parts by mass of a phosphorus-based antioxidant "Irgafos 168", 17 parts by mass of a propylene/α-olefin copolymer "TAFMER PN-2070", and 37 parts by mass of a hydrogenated petroleum resin "ARKON P140" (manufactured by ARAKAWA CHEMICAL INDUSTRIES, LTD., softening point: 140° C.) were melted and kneaded at the same time in a 2 L-volume kneader set to 180° C. so that the total amount of raw materials fed was set to 1 kg. After complete melting, 20 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (6).

The hot-melt adhesive (6) was obtained by replacing the hydrogenated terpene resin "CLEARON P150" in Example 1 with the hydrogenated petroleum resin "ARKON P140."

Comparative Example 1

As a conventional polyolefin-based high heat resistant hot-melt adhesive, trade name "YH871-7" manufactured by Hitachi Chemical Company, Ltd. was used to obtain a hot-melt adhesive (7).

Comparative Example 2

0.5 parts by mass of a hindered phenol antioxidant "Irganox 1010", 0.5 parts by mass of a phosphorus-based antioxidant "Irgafos 168", 17 parts by mass of a 1-butene/α-olefin copolymer "TAFMER BL2481M" (manufactured by Mitsui Chemicals, Inc., melting point: 58° C.), and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 20 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (8).

The hot-melt adhesive (8) was obtained by replacing the propylene/α-olefin copolymer "TAFMER PN-2070" in Example 1 with the 1-butene/α-olefin copolymer "TAFMER BL2481M."

Comparative Example 3

0.5 parts by mass of a hindered phenol antioxidant "Irganox 1010", 0.5 parts by mass of a phosphorus-based antioxidant "Irgafos 168", and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 37 parts by mass of a 1-butene homopolymer "PB0800M" was added thereto, followed by kneading for complete melting. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (9).

The hot-melt adhesive (9) was obtained by changing the amount of the propylene/α-olefin copolymer "TAFMER PN-2070" blended in Example 1 from 17 parts by mass to 0 parts by mass, and the amount of the 1-butene homopolymer "PB0800M" blended from 20 parts by mass to 37 parts by mass.

Comparative Example 4

0.5 parts by mass of a hindered phenol antioxidant "Irganox 1010", 0.5 parts by mass of a phosphorus-based antioxidant "Irgafos 168", 37 parts by mass of a propylene/α-olefin copolymer "TAFMER PN-2070", and 37 parts by mass of a hydrogenated terpene resin "CLEARON P150" were melted and kneaded at the same time in a 2 L-volume kneader set to 180° C. so that the total amount of raw materials fed was set to 1 kg. Next, 14 parts by mass of a polypropylene-based wax "Viscol 660-P" and 12 parts by mass of liquid polybutene "Nissan Polybutene 30N" were added thereto, followed by kneading for complete melting, and a mold release box was filled with the obtained melted product to obtain a hot-melt adhesive (10).

The hot-melt adhesive (10) was obtained by changing the amount of the propylene/α-olefin copolymer "TAFMER PN-2070" blended in Example 1 from 17 parts by mass to 37 parts by mass, and the amount of the 1-butene homopolymer "PB0800M" blended from 20 parts by mass to 0 parts by mass.

Comparative Example 5

0.5 parts by mass of a hindered phenol antioxidant "Irganox 1010", 0.5 parts by mass of a phosphorus-based antioxidant "Irgafos 168", 17 parts by mass of a propylene/α-olefin copolymer "TAFMER PN-2070", and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 20 parts by mass of a 1-butene homopolymer "PB0800M" was added thereto, followed by kneading for complete melting. Next, 26 parts by mass of a polypropylene-based wax "Viscol 660-P" was added thereto, followed by kneading for complete melting, and a mold release box was filled with the obtained melted product to obtain a hot-melt adhesive (11).

The hot-melt adhesive (11) was obtained by changing the amount of the polypropylene-based wax "Viscol 660-P" blended in Example 1 from 14 parts by mass to 26 parts by mass, and the amount of the liquid polybutene "Nissan Polybutene 30N" blended from 12 parts by mass to 0 parts by mass.

Comparative Example 6

0.5 parts by mass of a hindered phenol antioxidant "Irganox 1010", 0.5 parts by mass of a phosphorus-based antioxidant "Irgafos 168", 17 parts by mass of a propylene/α-olefin copolymer "TAFMER PN-2070", and 37 parts by mass of a hydrogenated terpene resin "CLEARON P150" were melted and kneaded at the same time in a 2 L-volume kneader set to 180° C. so that the total amount of raw materials fed was set to 1 kg. After complete melting, 20 parts by mass of a 1-butene homopolymer "PB0800M" was added thereto, followed by kneading for complete melting. Next, 26 parts by mass of liquid polybutene "Nissan Polybutene 30N" was added thereto, followed by kneading for complete melting, and a mold release box was filled with the obtained melted product to obtain a hot-melt adhesive (12).

The hot-melt adhesive (12) was obtained by changing the amount of the polypropylene-based wax "Viscol 660-P" blended in Example 1 from 14 parts by mass to 0 parts by mass (not blended), and the amount of the liquid polybutene "Nissan Polybutene 30N" blended from 12 parts by mass to 26 parts by mass.

[Evaluation]

Using the hot-melt adhesive compositions obtained in Examples 1 to 6 and Comparative Examples 1 to 6, softening point measurement, viscosity measurement, and dynamic viscoelasticity measurement were performed. Further, test pieces were prepared as follows and initial creep measurement, measurement of thermal creep resistance, and peeling strength measurement were performed. The results are shown in Tables 1 and 2.

(1) Softening Point Measurement

A softening point of each adhesive composition was measured by a ring and ball method in accordance with JIS K6863.

(2) Viscosity Measurement

A melt viscosity of each adhesive composition at 180° C. was measured with a Brookfield viscometer in accordance with JIS K6862.

(3) Dynamic Viscoelasticity Measurement

After the adhesive composition that has been melted by heating was cooled to 20° C., hardening behavior when the adhesive composition was maintained at 20° C. was measured in accordance with the following procedure to determine the complex shear modulus (I) and the complex shear modulus (II).

First, an adhesive composition was supplied to a stage set to 180° C. After the adhesive composition on the stage was melted, the adhesive composition was pressed with a parallel plate until a thickness of the adhesive composition to be measured was 300 μm, which was left to stand for 5 minutes. Then, the adhesive composition was cooled from 180° C. to 20° C. at a limit cooling rate of a measurement device at the same time with the start of the dynamic viscoelasticity measurement, and the complex shear modulus of the adhesive composition was subsequently measured while maintaining the adhesive composition at 20° C. Next, a ratio of the complex shear modulus (I) immediately after the temperature drops to 20° C. and the complex shear modulus (II) after 1500 seconds from the start of the measurement was determined.

A DISCOVERY HR-2 hybrid rheometer manufactured by TA Instruments Japan Inc. was used as a measurement device and a 25 mm parallel plate (peltier plate high temperature) was used as a parallel plate. Measurement frequency was 1.0 Hz and measurement strain was 0.1%. A temperature of a circulating cooling water was set to 20° C. and an atmosphere temperature of a measurement room was set to 23° C. to perform the measurement.

(4) Test Piece Producing Method

Using a roll coater set to 190° C., 100 g/m$^2$ of a hot-melt adhesive was applied (precoated) to a fabric (covering) lined with a polyurethane foam. Then, the fabric was left in an atmosphere of 25° C. for 24 hours. Next, the hot-melt adhesive side was heated by a far-infrared heater, and the fabric was taken out from the far-infrared heater when the surface temperature of the hot-melt adhesive reached 180° C. After the fabric was taken out from the far-infrared heater and left in an atmosphere of 25° C. for 45 seconds, the fabric and a polypropylene molded product ("Kobe Polysheet PP" manufactured by Hitachi Chemical Company, Ltd.) degreased by isopropyl alcohol were pressure-bonded by a pressure forming method (0.05 MPa, for 10 seconds) to obtain a test piece.

(5) Initial Creep Measurement

After 5 minutes from the preparation of the test piece, a load of 200 g/25 mm in a perpendicular direction was applied to one end of a fabric lined with a polyurethane foam in an atmosphere of 60° C. to thereby perform a creep test for 5 minutes and measure a peeling length.

(6) Measurement of Thermal Creep Resistance

After 2 hours from the preparation of the test piece, a load of 100 g/25 mm in a perpendicular direction was applied to one end of a fabric lined with a polyurethane foam in an atmosphere of 80° C. to thereby perform a creep test for 24 hours and measure a peeling length.

(7) Peeling Strength Measurement

After 2 hours from the preparation of the test piece, 180° C. peeling strength was measured by a tensile test machine in an atmosphere of 23° C. (tensile speed: 200 mm/min, width of test piece to be measured: 25 mm).

TABLE 1

| Example | | 1 | 2 | 3 | 4 | 5 | 6 |
|---|---|---|---|---|---|---|---|
| α-olefin homopolymer | | 20 | 20 | 15 | 25 | 20 | 20 |
| α-olefin copolymer (1) | | 17 | — | 22 | 12 | 17 | 17 |
| α-olefin copolymer (2) | | — | 17 | — | — | — | — |
| α-olefin copolymer (3) | | — | — | — | — | — | — |
| Tackifier resin (1) | | — | — | — | — | 37 | — |
| Tackifier resin (2) | | 37 | 37 | 37 | 37 | — | — |
| Tackifier resin (3) | | — | — | — | — | — | 37 |
| Wax | | 14 | 14 | 14 | 14 | 14 | 14 |
| Liquid softener | | 12 | 12 | 12 | 12 | 12 | 12 |
| Antioxidant (1) | | 0.5 | 0.5 | 0.5 | 0.5 | 0.5 | 0.5 |
| Antioxidant (2) | | 0.5 | 0.5 | 0.5 | 0.5 | 0.5 | 0.5 |
| Total | | 101 | 101 | 101 | 101 | 101 | 101 |
| | Unit | | | | | | |
| Softening point | ° C. | 141 | 138 | 143 | 140 | 140 | 141 |
| Melt viscosity | mPa · s | 37700 | 32600 | 71400 | 20200 | 28600 | 28400 |
| Complex shear modulus (I) | Pa | 347616 | 366648 | 325633 | 274564 | 197956 | 255728 |
| | MPa | 0.35 | 0.37 | 0.33 | 0.27 | 0.20 | 0.26 |
| Complex shear modulus (II) | Pa | 3500640 | 3199060 | 3148670 | 2414540 | 2726140 | 3118280 |
| | MPa | 3.50 | 3.20 | 3.15 | 2.41 | 2.73 | 3.12 |
| (II)/(I) | — | 10.1 | 8.7 | 9.7 | 8.8 | 13.8 | 12.2 |
| Initial creep | mm | 1 A | 1 A | 4 A | 1 A | 4 A | 1 A |
| Thermal creep resistance | mm | 4 A | 6 A | 9 A | 10 A/C | 8 A/C | 4 A |
| Peeling strength | N/25 mm | 5.0 B | 4.8 B | 5.1 B | 4.8 B | 5.2 B | 5.4 B |

TABLE 2

| Comparative Example | 1 | 2 | 3 | 4 | 5 | 6 |
|---|---|---|---|---|---|---|
| α-olefin homopolymer | — | 20 | 37 | — | 20 | 20 |
| α-olefin copolymer (1) | — | — | — | 37 | 17 | 17 |
| α-olefin copolymer (2) | — | — | — | — | — | — |
| α-olefin copolymer (3) | — | 17 | — | — | — | — |

TABLE 2-continued

| Comparative Example | | 1 | 2 | 3 | 4 | 5 | 6 |
|---|---|---|---|---|---|---|---|
| Tackifier resin (1) | | — | — | — | — | — | — |
| Tackifier resin (2) | | — | 37 | 37 | 37 | 37 | 37 |
| Tackifier resin (3) | | — | — | — | — | — | — |
| Wax | | — | 14 | 14 | 14 | 26 | — |
| Liquid softener | | — | 12 | 12 | 12 | — | 26 |
| Antioxidant (1) | | — | 0.5 | 0.5 | 0.5 | 0.5 | 0.5 |
| Antioxidant (2) | | — | 0.5 | 0.5 | 0.5 | 0.5 | 0.5 |
| Total | | — | 101 | 101 | 101 | 101 | 101 |
| | Unit | | | | | | |
| Softening point | °C. | 140 | 138 | 137 | 148 | 146 | 133 |
| Melt viscosity | mPa·s | 7000 | 35700 | 5210 | 230600 | 27600 | 45200 |
| Complex shear modulus (I) | Pa | 3320600 | 337394 | 393323 | 336804 | 3658500 | 303288 |
| | MPa | 3.32 | 3.37 | 0.39 | 0.34 | 3.66 | 3.03 |
| Complex shear modulus (II) | Pa | 4263020 | 3567850 | 3436750 | 3445570 | 3820380 | 1612450 |
| | MPa | 4.26 | 3.57 | 3.44 | 3.45 | 3.82 | 1.61 |
| (II)/(I) | — | 1.3 | 10.6 | 8.7 | 10.2 | 1.0 | 5.3 |
| Initial creep | mm | Adhesion failure | 1 A | 3 A | Application failure | Adhesion failure | 16 A |
| Thermal creep resistance | mm | Adhesion failure | >50 A | >50 A | Application failure | Adhesion failure | >50 A |
| Peeling strength | N/25 mm | Adhesion failure | 5.1 B | 5.6 B/C | Application failure | Adhesion failure | 5.2 A |

Materials described in Tables 1 and 2 are as follows:

α-olefin homopolymer: "PB0800M", 1-butene homopolymer, melting point: 124° C., MFR (190° C., load: 2.16 kg) 200 g/10 min α-olefin copolymer (1): "TAFMER PN-2070", propylene/α-olefin copolymer, melting point: 140° C.

α-olefin copolymer (2): "TAFMER BL3450M", 1-butene/α-olefin copolymer, melting point: 100° C.

α-olefin copolymer (3): "TAFMER BL2481M", 1-butene/α-olefin copolymer, melting point: 58° C.

Tackifier resin (1): "CLEARON P125", hydrogenated terpene resin, softening point: 125° C.

Tackifier resin (2): "CLEARON P150", hydrogenated terpene resin, softening point: 150° C.

Tackifier resin (3): "ARKON P140", hydrogenated petroleum resin, softening point: 140° C.

Wax: "Viscol 660-P", polypropylene-based wax, softening point: 145° C. liquid softener: "Nissan Polybutene 30N", liquid polybutene, kinetic viscosity (100° C.): 670 mm²/s Antioxidant (1): "Irganox 1010", hindered phenol antioxidant Antioxidant (2): "Irgafos 168", phosphorus-based antioxidant In the test results in Tables 1 and 2, "A" represents interfacial failure on a PP side; "B" represents material failure of a covering; "C" represents cohesive failure of an adhesive; and when "/" is used, the letter on the left side thereof is a main failure state.

Good bonding properties were obtained in the samples of Examples 1 to 6.

Adhesion failure was observed in Comparative Example 1 (trade name "YH871-7" manufactured by Hitachi Chemical Company, Ltd.). Thermal creep resistance properties were decreased in Comparative Example 2 (the melting point of the α-olefin copolymer was lower than 90° C.). In Comparative Example 3 (not containing an α-olefin copolymer having a melting point of 90° C.), thermal creep resistance properties were decreased. In Comparative Example 4 (not containing an α-olefin homopolymer), the hot-melt adhesive could not be applied with a roll coater. Adhesion failure was observed in Comparative Example 5 (not containing a liquid softener). In Comparative Example 6 (not containing a wax), initial creep properties and thermal creep resistance properties were degraded, and material failure of a covering was not observed in the peeling strength measurement.

The invention claimed is:

1. An adhesive composition comprising:
   an α-olefin homopolymer containing a 1-butene homopolymer;
   an α-olefin copolymer having a melting point of 90° C. or higher;
   a tackifier resin;
   a wax; and
   a liquid softener,
   wherein a complex shear modulus (I) measured immediately after heating the adhesive composition to 180° C. and cooling the same to 20° C. is 1 MPa or less.

2. The adhesive composition according to claim 1, wherein the α-olefin copolymer contains at least one of a 1-butene/α-olefin copolymer and a propylene/α-olefin copolymer.

3. The adhesive composition according to claim 1, wherein the tackifier resin contains at least one selected from the group consisting of a terpene phenol resin, a hydrogenated terpene resin, and a hydrogenated petroleum resin.

4. The adhesive composition according to claim 1, wherein the wax contains a polypropylene-based wax.

5. The adhesive composition according to claim 1 having a melt viscosity of 100 Pas or less at 180° C.

6. The adhesive composition according to claim 1, wherein a peeling length is 10 mm or less when performing a thermal creep resistance test with a load of 100 g for 24 hours in an atmosphere of 80° C. after bonding adherends via the adhesive composition with an open time of 45 seconds.

* * * * *